United States Patent
Sugiyama et al.

(10) Patent No.: US 10,712,985 B2
(45) Date of Patent: Jul. 14, 2020

(54) SETTING CONTROL DEVICE THAT CHANGES FROM ONE AREA TO ANOTHER, SETTING CONTROL METHOD, AND PROGRAM

(71) Applicant: KONICA MINOLTA, INC., Chiyoda-ku, Tokyo (JP)

(72) Inventors: Takanobu Sugiyama, Nishinomiya (JP); Xingyue Li, Amagasaki (JP); Masanori Nishida, Kobe (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 16/379,928

(22) Filed: Apr. 10, 2019

(65) Prior Publication Data

US 2019/0324700 A1 Oct. 24, 2019

(30) Foreign Application Priority Data

Apr. 19, 2018 (JP) .................................. 2018-080886

(51) Int. Cl.
*G06F 3/12* (2006.01)

(52) U.S. Cl.
CPC .......... *G06F 3/1257* (2013.01); *G06F 3/1205* (2013.01); *G06F 3/1231* (2013.01)

(58) Field of Classification Search
None
See application file for complete search history.

(56) References Cited

U.S. PATENT DOCUMENTS

| | | | |
|---|---|---|---|
| 2006/0199580 A1* | 9/2006 | Zhang | H04W 48/18 455/432.1 |
| 2018/0027409 A1* | 1/2018 | Khanna | H04B 5/00 455/41.2 |
| 2018/0343544 A1* | 11/2018 | Fan | A63H 30/04 |

FOREIGN PATENT DOCUMENTS

JP 2002041257 A 2/2002

* cited by examiner

*Primary Examiner* — Lennin R Rodriguezgonzalez
(74) *Attorney, Agent, or Firm* — Buchanan Ingersoll & Rooney PC

(57) ABSTRACT

A non-transitory recording medium storing a computer readable program causes a computer to perform: a) detecting a change from a first area to a second area according to a change in a usage area of a setting control device; b), in a case where the change in the usage area is detected in a), determining whether to change a setting value of each of a plurality of setting items; and c) performing control for the setting values of the plurality of setting items, wherein, in c), a setting value of a change target item, which is a setting item whose setting value is determined to be changed is changed to a value corresponding to the second area, and a setting value of a non-change target item which is a setting item other than the change target item is maintained as a value before the usage area is changed.

19 Claims, 19 Drawing Sheets

FIG. 5

PRINT SETTING  210, 200

FAVORITE: STANDARD SETTING ▼    ADD

ORIGINAL ORIENTATION: ◉ VERTICAL  ○ HORIZONTAL

NUMBER OF COPIES: 1

ORIGINAL SIZE: A4 ▼

PRINT TYPE: TWO-SIDED ▼

PAPER SIZE: SAME AS ORIGINAL SIZE ▼

PAGE LAYOUT: OFF ▼

OUTPUT METHOD: NORMAL PRINTING ▼

COLOR SELECTION: AUTO COLOR ▼

[OK]  [CANCEL]  [APPLY]

FIG. 6

PRINT SETTING  220, 200

FAVORITE: STANDARD SETTING ▼    ADD

ORIGINAL ORIENTATION: ◉ VERTICAL  ○ HORIZONTAL

NUMBER OF COPIES: 1

ORIGINAL SIZE: A5 ▼

PRINT TYPE: SINGLE-SIDED ▼

PAPER SIZE: SAME AS ORIGINAL SIZE ▼

PAGE LAYOUT: 2 in 1 ▼

OUTPUT METHOD: NORMAL PRINTING ▼

COLOR SELECTION: AUTO COLOR ▼

[OK] 201  [CANCEL]  [APPLY] 203

FIG. 7

| PRINT SETTING | | | |
|---|---|---|---|
| FAVORITE | STANDARD SETTING ▼ | | ADD |
| ORIGINAL ORIENTATION | ⦿ VERTICAL ○ HORIZONTAL | NUMBER OF COPIES | 1 ⬥ |
| ORIGINAL SIZE | Letter ▼ | PRINT TYPE | SINGLE-SIDED ▼ |
| PAPER SIZE | SAME AS ORIGINAL SIZE ▼ | PAGE LAYOUT | 2 in 1 ▼ |
| OUTPUT METHOD | NORMAL PRINTING ▼ | COLOR SELECTION | AUTO COLOR ▼ |
| | OK | CANCEL | APPLY |

FIG. 8

| NAME | ORIGINAL ORIENTATION | ORIGINAL SIZE | PRINT TYPE | PAGE LAYOUT | COLOR SELECTION | ... |
|---|---|---|---|---|---|---|
| BASIC CUSTOMIZED SETTING | VERTICAL | A5 | SINGLE-SIDED | 2 in 1 | AUTO COLOR | |

| AREA | ORIGINAL ORIENTATION | ORIGINAL SIZE | PRINT TYPE | PAGE LAYOUT | COLOR SELECTION | BINDING DIRECTION | PAGE LAYOUT (ORDER) |
|---|---|---|---|---|---|---|---|
| JAPAN | VERTICAL | A4 | TWO-SIDED | OFF | AUTO COLOR | LEFT BINDING | LEFT TO RIGHT |
| UNITED STATES | VERTICAL | Letter | TWO-SIDED | OFF | AUTO COLOR | LEFT BINDING | LEFT TO RIGHT |
| EUROPEAN COUNTRIES | VERTICAL | A4 | TWO-SIDED | OFF | AUTO COLOR | LEFT BINDING | LEFT TO RIGHT |
| ARAB COUNTRIES | VERTICAL | A4 | TWO-SIDED | OFF | AUTO COLOR | RIGHT BINDING | RIGHT TO LEFT |

FIG. 12

| NAME | ORIGINAL ORIENTATION | ORIGINAL SIZE | PRINT TYPE | PAGE LAYOUT | COLOR SELECTION | ... |
|---|---|---|---|---|---|---|
| BASIC CUSTOMIZED SETTING | VERTICAL | Letter | SINGLE-SIDED | 2 in 1 | AUTO COLOR | ... |

| AREA 1 | AREA 2 | CHANGE IS REQUIRED | | CHANGE IS NOT REQUIRED | |
|---|---|---|---|---|---|
| JAPAN | UNITED STATES | ORIGINAL SIZE | — | PRINT TYPE | PAGE LAYOUT |
| JAPAN | EUROPEAN COUNTRIES | | BINDING DIRECTION | ORIGINAL SIZE | PRINT TYPE |
| JAPAN | ARAB COUNTRIES | | N in 1 (ORDER) | ORIGINAL SIZE | PRINT TYPE |
| ... | | | | ... | |

| NAME | ORIGINAL ORIENTATION | ORIGINAL SIZE | PRINT TYPE | PAGE LAYOUT | COLOR SELECTION |
|---|---|---|---|---|---|
| BASIC CUSTOMIZED SETTING | VERTICAL | A5 | SINGLE-SIDED | 2 in 1 | AUTO COLOR |
| FAVORITE SETTING 1 | VERTICAL | A4 | TWO-SIDED | OFF | GRAY SCALE |
| FAVORITE SETTING 2 | VERTICAL | A3 | SINGLE-SIDED | 4 in 1 | AUTO COLOR |

PRINT SETTING (230, 200) (205)

- FAVORITE: FAVORITE SETTING 2 ▼ | ADD
- ORIGINAL ORIENTATION: ● VERTICAL ○ HORIZONTAL
- NUMBER OF COPIES: 1
- ORIGINAL SIZE: A3 ▼
- PRINT TYPE: SINGLE-SIDED ▼
- PAPER SIZE: SAME AS ORIGINAL SIZE ▼
- PAGE LAYOUT: 4 in 1 ▼
- OUTPUT METHOD: NORMAL PRINTING ▼
- COLOR SELECTION: AUTO COLOR ▼

[OK] [CANCEL] [APPLY]

FIG. 16

PRINT SETTING (703) (207) (220, 200)

- FAVORITE: STANDARD SETTING ▼ | ADD
  - FAVORITE SETTING 1
  - FAVORITE SETTING 2
- ORIGINAL ORIENTATION: ● VERTICAL ○ HORIZONTAL
- NUMBER OF COPIES: 1
- ORIGINAL SIZE: A5 ▼
- PRINT TYPE: SINGLE-SIDED ▼
- PAPER SIZE: SAME AS ORIGINAL SIZE ▼
- PAGE LAYOUT: 2 in 1 ▼
- OUTPUT METHOD: NORMAL PRINTING ▼
- COLOR SELECTION: AUTO COLOR ▼

[OK] [CANCEL] [APPLY]

FIG. 17

PRINT SETTING

FAVORITE: FAVORITE SETTING 2 ▼ | ADD

ORIGINAL ORIENTATION: ● VERTICAL ○ HORIZONTAL

NUMBER OF COPIES: 1

ORIGINAL SIZE: Letter ▼

PRINT TYPE: SINGLE-SIDED ▼

PAPER SIZE: SAME AS ORIGINAL SIZE ▼

PAGE LAYOUT: 4 in 1 ▼

OUTPUT METHOD: NORMAL PRINTING ▼

COLOR SELECTION: AUTO COLOR ▼

OK | CANCEL | APPLY

FIG. 18

PRINT SETTING

FAVORITE: STANDARD SETTING ▼ | ADD
- FAVORITE SETTING 1
- FAVORITE SETTING 2

ORIGINAL ORIENTATION: ● VERTICAL ○ HORIZONTAL

NUMBER OF COPIES: 1

ORIGINAL SIZE: Letter ▼

PRINT TYPE: SINGLE-SIDED ▼

PAPER SIZE: SAME AS ORIGINAL SIZE ▼

PAGE LAYOUT: 2 in 1 ▼

OUTPUT METHOD: NORMAL PRINTING ▼

COLOR SELECTION: AUTO COLOR ▼

OK | CANCEL | APPLY

FIG. 19

| NAME | ORIGINAL ORIENTATION | ORIGINAL SIZE | PRINT TYPE | PAGE LAYOUT | COLOR SELECTION |
|---|---|---|---|---|---|
| BASIC CUSTOMIZED SETTING | VERTICAL | Letter | SINGLE-SIDED | 2 in 1 | AUTO COLOR |
| FAVORITE SETTING 1 | VERTICAL | Letter | TWO-SIDED | OFF | GRAY SCALE |
| FAVORITE SETTING 2 | VERTICAL | Letter | SINGLE-SIDED | 4 in 1 | AUTO COLOR |

701, 701b →
702, 702b →
703, 703b →

700

SETTING CONTROL DEVICE THAT CHANGES FROM ONE AREA TO ANOTHER, SETTING CONTROL METHOD, AND PROGRAM

The entire disclosure of Japanese patent Application No. 2018-080886, filed on Apr. 19, 2018, is incorporated herein by reference in its entirety.

BACKGROUND

Technological Field

The present invention relates to a setting control device and a technique related to the setting control device.

Description of the Related Art

In a setting control device (for example, a personal computer), a user performs a setting operation (for example, a print job setting operation) for a plurality of setting items using a setting control program (for example, a printer driver). For example, the setting operation is performed on the basis of an initial value group (an aggregate of a plurality of initial values of the plurality of setting items) which has been prepared for the plurality of setting items in a setting control program.

However, some users have many opportunities to use a value different from the initial value for at least one setting item. In this case, the users need to change the setting value of the at least one setting item from the initial value to another value (a value that is frequently used by the user) whenever setting a print job, which is inconvenient for the users.

In order to solve the above-mentioned problem, a technique has been proposed which enables the user to register a setting value group (also referred to as a customized setting value group) in which the setting value (a setting value which is a standard for the setting operation) of the at least one setting item among a plurality of setting items has been changed (customized) from the initial value to another value (a value frequently used by the user). According to the technique, in a case where a print job is set after the registration, the user can perform a setting operation on the basis of the setting value group (customized setting value group) in which the setting value of at least one setting item has been set to the value frequently used by the user. Therefore, it is possible to improve the convenience of the user.

A technique different from the above-mentioned technique has been proposed which collectively sets the initial values of setting items to values corresponding to the culture (custom) of the area where a setting control program has been installed.

For example, JP 2002-41257 A discloses a technique which collectively sets the initial values of a plurality of setting items to values corresponding to the usage area (for example, Japan or the United States) of a setting control device according to the setting content of the usage area of the setting control device in a case where a setting control program is installed.

However, for example, in Japan, after a setting control program is installed in a setting control device and a user registers a customized setting value group, the user may move from Japan to the United States (for example, on a business trip) together with the setting control device. It is considered that, even after the user moves from Japan to the United States, the user performs, for example, a print job setting operation on the basis of the customized setting value group registered in Japan.

However, it is not always possible to use the setting values of all of the setting items in the customized setting value group in the United States (the changed usage area) without any change. It is preferable to change the setting values of some setting items in the customized setting value group to values corresponding to the United States due to the difference in culture between Japan and the United States.

In view of this situation, the following is considered: in a case where the technique described in JP 2002-41257 A is applied and the usage area of the setting control device is changed from, for example, Japan to the United States after the setting control program is installed, all of the setting values in the customized setting value group are always collectively changed to values corresponding to the changed area (here, the United States) according to a change in the usage area.

However, in a case where the setting values of all of the setting items are always collectively changed according to a change in the usage area, the following problems may occur.

For example, in a case where all of the setting values in the customized setting value group are collectively changed according to a change in the usage area, even the setting value of at least one setting item which has been changed (customized) by the user is changed. As a result, the user needs to customize the setting values of some of the setting items again.

SUMMARY

Accordingly, an object of the invention is to provide a technique that can flexibly perform control for setting values of a plurality of setting items according to a change in a usage area of a setting control device.

To achieve the abovementioned object, according to an aspect of the present invention, there is provided a non-transitory recording medium storing a computer readable program reflecting one aspect of the present invention that causes a computer provided in a setting control device to perform: a) detecting a change from a first area to a second area according to a change in a usage area of the setting control device; b), in a case where the change in the usage area is detected in a), determining whether or not to change a setting value of each of a plurality of setting items according to the change in the usage area from the first area to the second area; and c) performing control for the setting values of the plurality of setting items on the basis of a determination result in b), wherein, in c), a setting value of a change target item, which is a setting item whose setting value is determined to be changed according to the change in the usage area from the first area to the second area, among the plurality of setting items is changed to a value corresponding to the second area, and a setting value of a non-change target item which is a setting item other than the change target item among the plurality of setting items is maintained as a value before the usage area is changed.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 5 is a diagram illustrating a mint setting screen (before the usage area is changed) in which a setting value of each setting item is set to an initial value;

FIG. 6 is a diagram illustrating a print setting screen (before the usage area is changed) in which a setting value of a specific setting item has been changed by a user;

FIG. 7 is a diagram illustrating a print setting screen displayed after the usage area is changed;

FIG. 8 is a diagram illustrating a customized setting value group management table;

FIG. 9 is a diagram illustrating an initial value group management table;

FIG. 12 is a diagram illustrating a customized setting value group management table after the usage area is changed;

FIG. 13 is a diagram illustrating a change necessity management table;

FIG. 14 is a diagram illustrating a customized setting value group management table according to a third embodiment;

FIG. 15 is a diagram illustrating a print setting screen (before the usage area is changed) in a case where a favorite setting value group is registered;

FIG. 16 is a diagram illustrating a print setting screen (before the usage area is changed) in a case where the favorite setting value group is called;

FIG. 17 is a diagram illustrating a mint setting screen (after the usage area is changed) in which the called favorite setting value group has been reflected;

FIG. 18 is a diagram illustrating a print setting screen (after the usage area is changed) in a case where the favorite setting value group is called;

FIG. 19 is a diagram illustrating a customized setting value group management table according to the third embodiment after the usage area is changed;

DETAILED DESCRIPTION OF EMBODIMENTS

Hereinafter, one or more embodiments of the present invention will be described with reference to the drawings. However, the scope of the invention is not limited to the disclosed embodiments.

1. First Embodiment 1-1. System Configuration

Figure 1:
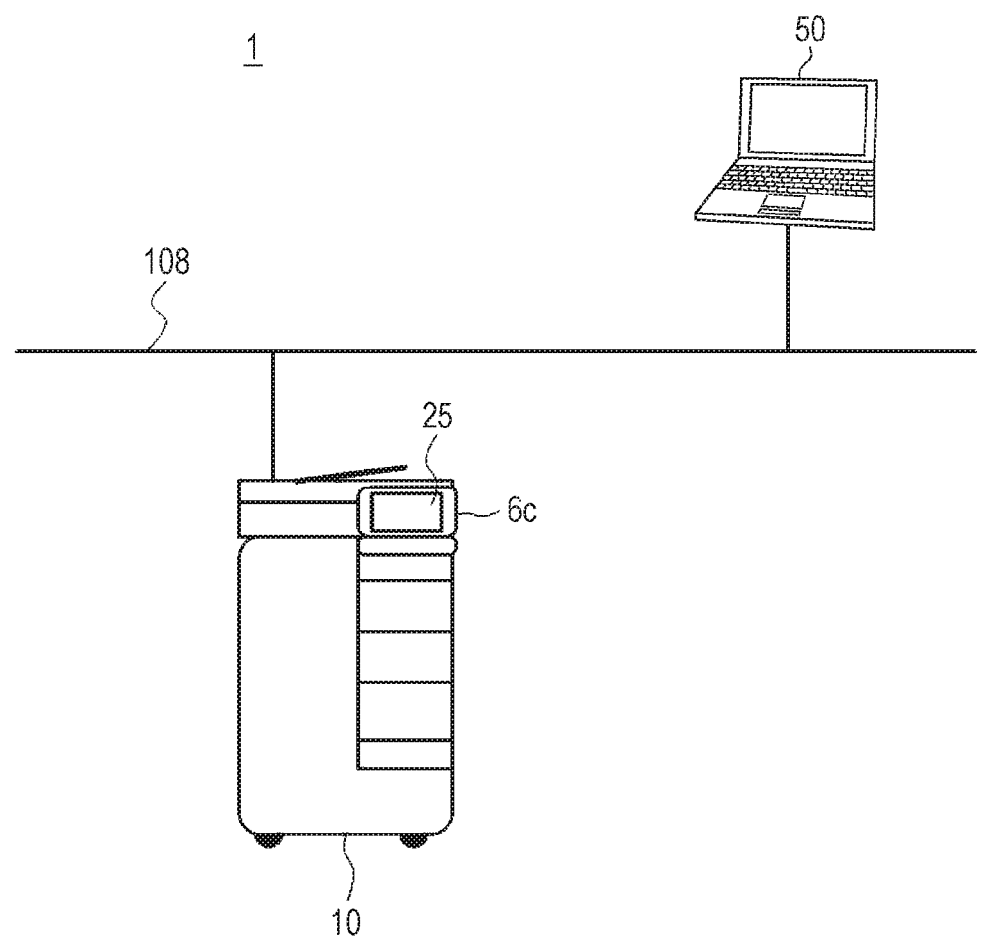
FIG. 1 is a diagram schematically illustrating the configuration of a printing system.

FIG. 1 is a diagram schematically illustrating the configuration of a printing system 1 according to an embodiment of the invention. As illustrated in FIG. 1, the printing system 1 includes a multi-functional peripheral (which is also abbreviated to MFP) 10 and a computer 50.

The MFP 10 and the computer 50 are connected to each other through a network 108 such that data can be transmitted and received between the MFP 10 and the computer 50. In addition, the network 108 includes various networks such as a local area network (LAN) and the Internet.

The MFP 10 functions as a printer that executes a print job based on print job data from the computer 50.

Specifically, in the computer 50, a setting control program (here, a printer driver) installed in the computer 50 displays a print setting screen 200 for example, FIG. 5). Then, the computer 50 receives a setting operation for a setting value of each setting item on the print setting screen 200 from a user and then receives a print execution instruction (for example, an operation of pressing a print start button (not illustrated)) from the user. The computer 50 transmits print job data (a print execution command and data to be printed) to the MFP 10 (job execution device) in response to the print execution instruction.

Then, the MFP 10 receives the print job data transmitted from the computer 50 and executes a print job based on the print job data. In this way, a printout process is performed by the MFP 10.

1-2. Configuration of MFP 10

Figure 2:
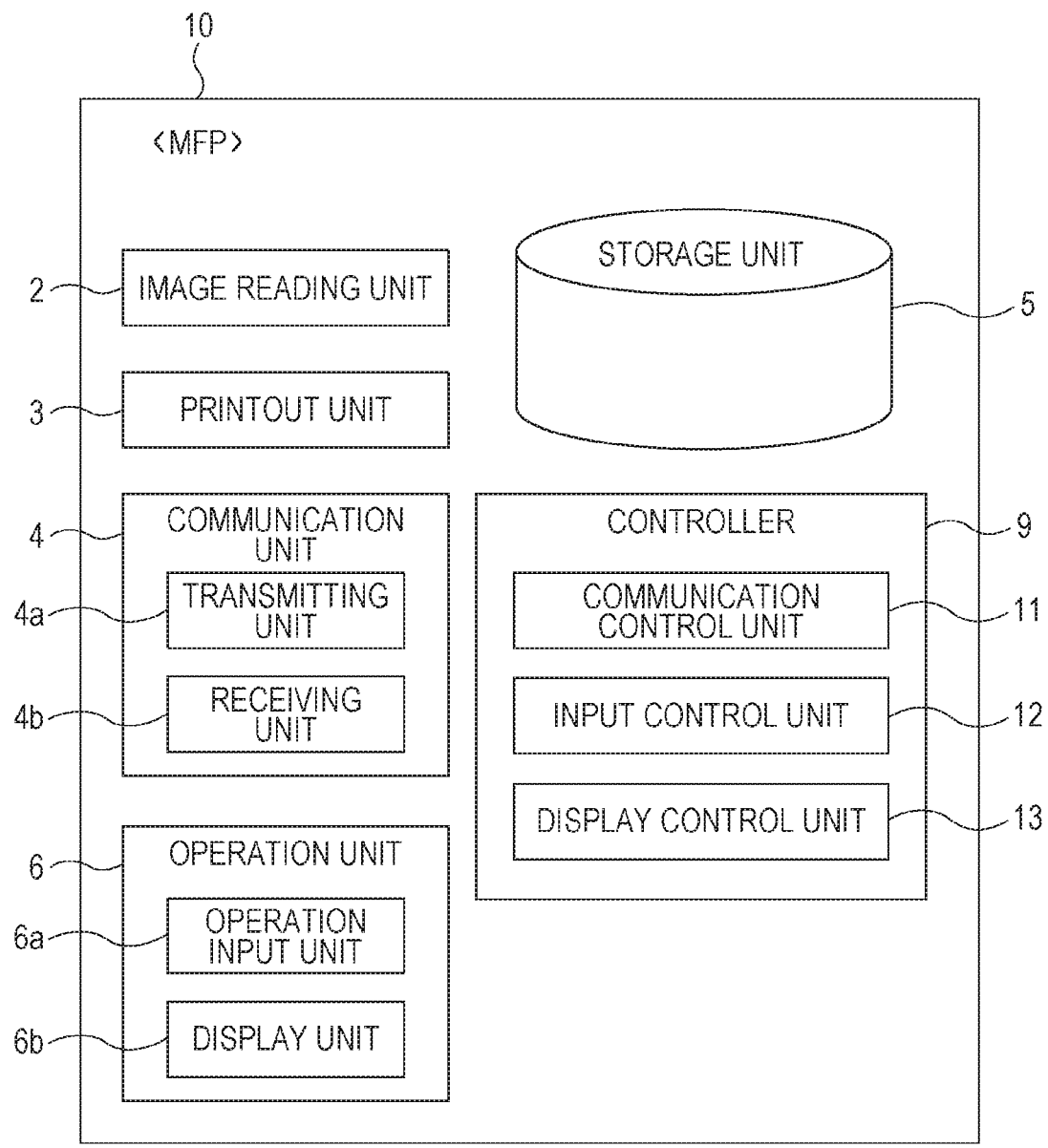
FIG. 2 is a functional block diagram illustrating an MFP.

FIG. 2 is a functional block diagram illustrating the MFP 10.

The MFP 10 is a device (also referred to as a multi-function machine) having, for example, a scanning function, a copy function, a facsimile function, and a box storage unction. Specifically, as illustrated in the functional block diagram of FIG. 2, the MFP 10 includes an image reading unit 2, a printout unit 3, a communication unit 4, a storage unit 5, an operation unit 6, and a controller 9 (control unit) and these units are complexly operated to implement various functions. In addition, the MFP 10 is also referred to as an image processing device, an image forming device, or a printout device.

The image reading unit 2 is a processing unit that optically reads a document placed at a predetermined position of the MFP 10 and generates image data (also referred to as a document image or a scanned image) of the document.

The printout unit 3 is an output unit that prints out an image on various media including paper on the basis of image data related to the image to be printed.

The communication unit 4 is a processing unit that can perform facsimile communication through, for example, a public line. In addition, the communication unit 4 can perform network communication through the network 108. In the network communication, various protocols, such as transmission control protocol/internet protocol (TCP/IP) and file transfer protocol (FTP), are used and the use of the network communication makes it possible for the MFP 10 to transmit and receive various types of data (for example, print job data) to and from a desired opposite party (for example, the computer 50).

The storage unit 5 is a storage device such as a hard disk drive (HDD).

The operation unit 6 includes an operation input unit 6a that receives the input of an operation for the MFP 10 and a display unit 6b that displays and outputs various kinds of information. The MFP 10 is provided with an operation panel unit 6c (see FIG. 1) having a substantial plate shape. The operation panel unit 6c includes a touch panel (operation panel) 25 (see FIG. 1) provided on the front surface side. The touch panel 25 is configured by providing, for example, a piezoelectric sensor in a liquid crystal display panel, can display various kinds of information, and can receive an operation input by an operator.

The controller (control unit) 9 is a control device that is provided in the MFP and controls the overall operation of the MFP 10. The controller 9 is a computer system including a CPU and various semiconductor memories (for example, a RAM and a ROM). In the controller 9, the CPU executes a predetermined software program (hereinafter, simply referred to as a program) stored in the ROM (for example, an EEPROM) to implement various processing units. In addition, the program (specifically, a program, module group) may be installed in the MFP 10 through a portable recording medium, such as a USB memory, or the network 108.

Specifically, as illustrated in FIG. 2, the controller 9 executes the program to implement various processing units including a communication control unit 11, an input control unit 12, and a display control unit 13.

The communication control unit 11 is a processing unit that controls a communication operation with another device (for example, the computer 50).

The input control unit 12 is a control unit that controls operation of input operation to the operation input unit 6a.

The display control unit 13 is a processing unit that controls a display operation of the display unit 6b.

Here, the CPU of the controller 9 mainly executes a software program to perform the above-mentioned various operations. However, the invention is not limited thereto. For example, dedicated hardware provided in the MFP 10 (specifically, inside or outside the controller 9) may be used to perform the above-mentioned various operations. For example, some or all of the communication control unit 11, the input control unit 12, and the display control unit 13 (FIG. 2) may be implemented by one or a plurality of dedicated hardware components.

1-3. Configuration of Computer 50

Figure 3:
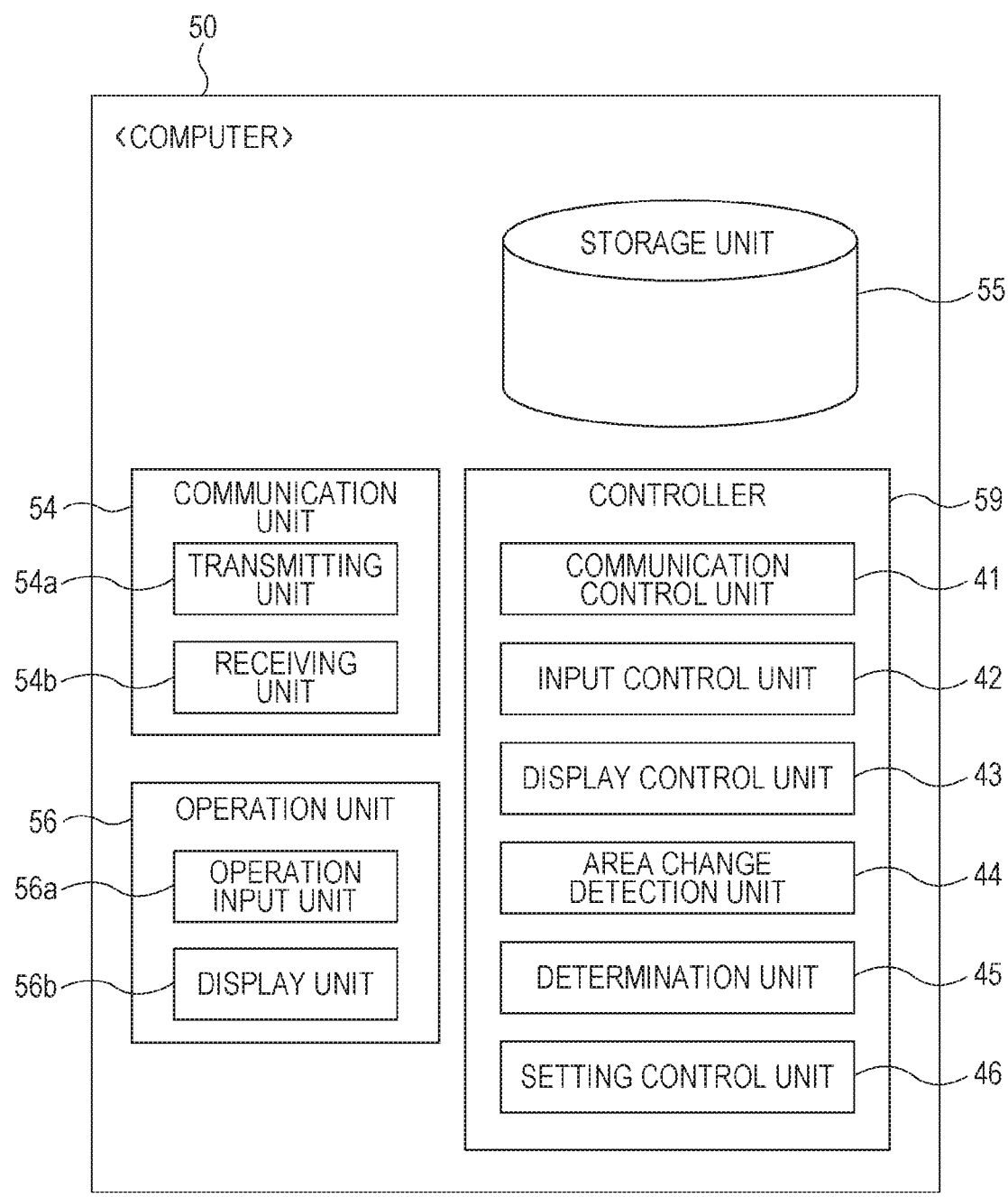
FIG. 3 is a block diagram illustrating the hardware configuration of a computer (setting control device)

FIG. 3 is a functional block diagram illustrating the schematic configuration of the computer 50. The computer 50 is, for example, a so-called personal computer. The computer 50 is a computer (user computer) that is used by the user of the MFP 10.

The computer 50 includes, for example, a communication unit 54, a storage unit 55, an operation unit 56, and a controller (control unit) 59 as illustrated in the functional block diagram of FIG. 3. These units are complexly operated to implement various functions.

The communication unit 54 can perform network communication through the network. In the network communication, various protocols including, for example, transmission control protocol/internet protocol (TCP/IP) are used. The use of the network communication makes it possible for the computer 50 to transmit and receive various types of data to and from a desired opposite party (for example, the MFP 10). The communication unit 54 includes a transmitting unit 54a that transmits various types of data and a receiving unit 54b that receives various types of data.

The storage unit 55 is a storage device, such as a hard disk drive (HDD) and/or a semiconductor memory.

The storage unit 55 stores, for example, an initial value group management table 500 (FIG. 9) and a customized setting value group management table 700 (FIG. 8) which will be described below.

The operation unit 56 includes an operation input unit 56a that receives the input of an operation for the computer 50 and a display unit 56b that displays and outputs various kinds of information.

The controller (control unit) 59 illustrated in FIG. 3 is a control device that is provided in the computer 50 and controls the overall operation of the computer 50. The controller 59 is a computer system including, for example, a CPU and various semiconductor memories (a RAM and a ROM). In the controller 59, the CPU executes a predetermined program stored in a storage unit (for example, a semiconductor memory) to implement various processing units. In addition, the program (specifically, a program module group) may be recorded on a portable recording medium, such as a USB memory, may be read from the recording medium, and may be installed in the computer 50. Alternatively, the program may be downloaded through, for example, the network 108 and then installed in the computer 50.

A setting control program (here, a printer driver) that can set the setting values of a plurality of setting items is installed in the computer 50. The computer 50 functions as a setting control device that controls the setting of various setting items, such as a print job.

Specifically, the controller 59 executes the program to implement various processing units including a communication control unit 41, an input control unit 42, a display control unit 43, an area change detection unit 44, a determination unit 45, and a setting control unit 46.

For example, the communication control unit 41 is a processing unit that controls a communication operation with the MFP 10 in cooperation with the communication unit 54. For example, the communication control unit 41 controls an operation of transmitting print job data to the MFP 10 in cooperation with the communication unit 54.

The input control unit 42 is a control unit that controls, for example, an operation (operation input operation) of receiving an operation input by the user in cooperation with the operation input unit 56a. For example, the input control unit 42 receives an operation of setting setting values related to setting items on the print setting screen 200 (for example, FIG. 5) from the user in cooperation with the operation input unit 56a.

The display control unit 43 is a processing unit that controls the operation of the display unit 56b displaying various kinds of information (for example, the print setting screen 200).

The area change detection unit 44 is a processing unit that performs a process (hereinafter, also referred to as an area change detection process) of detecting a change in the usage area of the computer 50.

The determination unit 45 is a processing unit that performs various determination processes.

The setting control unit 46 is a processing unit that performs, for example, control (setting control) for the setting values of a plurality of setting items (a plurality of setting, items related to a print job).

Here, the CPU of the controller 59 mainly executes a software program to perform the above-mentioned various operations. However, the invention is not limited thereto. For example, dedicated hardware provided in the computer 50 (specifically, inside or outside the controller 59) may be used to perform the above-mentioned various operations. For example, some or all of the communication control unit 41, the input control unit 42, the display control unit 43, the area change detection unit 44, the determination unit 45, and the selling control unit 46 (FIG. 3) may be implemented by one or a plurality of dedicated hardware components.

1-4. Operation

For Initial Value Group of Plurality of Setting Items

In the printer driver, an initial value group (initial setting value group) which is an aggregate of a plurality of initial values (values in the initial state of the printer driver (values immediately after installation)) of a plurality of setting items related to a print job is defined in advance. Each value in the initial value group is defined as a value that is assumed to be standardly used by the user for each setting item. The initial value group is also referred to as, for example, a default setting value group (an aggregate of a plurality of default values of a plurality of setting items) (of the printer driver).

In the printer driver, the initial value group is defined for each area. The initial value group for each area is defined in the initial value group management table 500 in consideration of the culture (custom) of each area. FIG. 9 is a diagram illustrating the initial value group management table 500.

For example, the initial value of a setting item "Original Size" in Japan is defined as a value "A4", considering that paper with an A-series size (for example, "A4") is conventionally used in Japan. In addition, in the United States, the initial value of the setting item "Original Size" in the United States is defined as a value "Letter", considering that paper with a standardized size (for example, "Letter") is conventionally used in the United States. For a setting item (for example, "Print Type") without a setting value that is conventionally used according to area, a common value (for example, "Two-sided") is defined as the initial value in each area (see FIG. 9).

In this way, the initial value group for each area is defined by the initial value group management table 500.

FIG. 5 is a diagram illustrating a print setting screen 210 (200) in which each setting item has been set to the initial value (the initial value group before the usage area is changed). Here, it is assumed that the printer driver is installed in Japan and a plurality of setting items are set to an initial value group (FIG. 9) in Japan.

Immediately after the primer driver is installed, the print setting screen 210 (an initial setting screen in Japan) is displayed when the printer driver starts. Then, the user performs a setting operation for a print job on the basis of the initial value group (default setting value group) in Japan.

For Customized Setting Value Group of Plurality of Setting Items

However, some users have many opportunities to use a value different from the initial value for at least one setting item. In this case, the users need to change the setting value of the at least one setting item from the initial value to another value (a value that is frequently used by the user) whenever setting the print job, which is inconvenient for the users.

In the printer driver, the user can register in advance a setting value group (also referred to as a customized setting value group) in which the setting value of at least one setting item among a plurality of setting items has been changed (customized) (from the initial value) to the value frequently used by the user, considering the above-mentioned point. In this case, the user can perform a setting operation for each setting item on the basis of the customized setting value group (the setting value group in which at least one setting item has been set to the value frequently used by the user). Therefore, it is possible to improve the convenience of the user.

Here, the user registers in advance a customized setting value group (also referred to as a basic customized setting value group 701) for a plurality of setting items immediately after the printer driver starts. The user can register a plurality of customized setting value groups, which will be described below. The basic customized setting value group 701 is a setting value group that is set first (standardly used) after the printer driver starts among the plurality of customized setting value groups. In addition, the basic customized setting value group 701 is a customized setting value group that the user personally wants to standardly use, which will be described below. Therefore, the basic customized setting value group 701 is also referred to as, for example, a default setting value group "for each user" (standard setting value group). In contrast, the initial value group (see FIG. 9) is also referred to as, for example, a default setting value group (standard setting value group) (before customization) of the "printer driver".

The basic customized setting value group 701 is registered as follows. Here, it is assumed that an operation of registering the basic customized setting value group 701 is performed in Japan (the usage area before change).

The user sets the setting value of each setting item to a desired value (for example, the value frequently used by the user) in the print setting screen 210 (the initial selling screen in Japan) illustrated in FIG. 5. FIG. 6 is a diagram illustrating a print setting screen 220 (200) in which each setting item is set to the basic customized setting value group 701 (see FIG. 8). Here, the user changes the setting value of the setting item "Original Size" from an initial value (the initial value in Japan) "A4" (FIG. 5) to a value "A5" (FIG. 6) and changes the setting value of a setting item "Print Type" from an initial value (an initial value in Japan) "Two-sided" (FIG. 5) to a value "Single-sided" (FIG. 6). In addition, the user changes the setting value of a setting item "Page Layout" from an initial value "Off" (FIG. 5) to a value "2 in 1" (FIG. 6). Here, the setting values of other setting items are set to the initial values in Japan without any change.

Then, the computer 50 (printer driver) registers the basic customized setting value group 701 in the customized setting value group management table 700 (FIG. 8) in response to the operation of the user pressing an "Apply" button 203 (FIG. 6). The "Apply" button 203 is a user interface component for registering the setting values of a plurality of setting items as the basic customized setting value group 701 at the time of the operation of pressing the "Apply" button 203. In addition, an "OK" button 201 (FIG. 6) in the print setting screen 200 (for example, 220) is a user interface component for deciding the content of the print settings of (only) the current print job.

FIG. 8 is a diagram illustrating the customized setting value group management table 700. The customized setting value group which has been set by the user for a plurality of setting items is managed. (registered) in the customized setting value group management table 700. Here, in the basic customized setting value group 701, as illustrated in FIG. 8, the setting values of three setting items "Original Size", "Print Type", and "Page Layout" among a plurality of setting items have been changed (customized) from the initial values in Japan to values designated by the user. In addition, in the basic customized setting value group 701, the setting values of setting items (for example, "Original Orientation") other than the three setting items are set to the initial values in Japan. Each setting value in the basic customized setting value group 701 is registered so as to be associated with each setting item.

Then, at the time of the subsequent startup of the printer driver (immediately after the startup), the print setting screen 220 (the customized setting screen in Japan) illustrated in FIG. 6 is displayed. Specifically, a plurality of setting items set to the basic customized setting value group 701 are displayed (see FIG. 6). Then, the user performs a setting operation for each setting item on the basis of the print setting screen 220 (the customized setting screen in Japan).

For Technique According to Comparative Example

However, for example, in some cases, after the printer driver is installed in the computer 50 and the basic customized setting value group 701 is registered by the user. In Japan, the user moves from Japan to the United States (for example, on a business trip) together with the computer 50. It is considered that, even after the user moves from Japan to the United States, the user performs a print job setting operation on the basis of the basic customized setting value group 701 registered in Japan.

However, it is not always possible to use the setting values of all of the setting items in the basic customized setting value group 701 in the United States (changed usage area) without any change. It is preferable to change the values of some setting items in the basic customized setting value group 701 to values corresponding to the United States (the initial values in the United States) due to the difference in culture between Japan and the United States.

For example, as described above, while paper with A-series size is conventionally used in Japan, paper with a size standardized in the United States (for example, "Letter") is conventionally used in the United States. Therefore, for example, in a case where the setting value of the setting item "Original Size" is set to the value "A5" (A-series size) in the basic customized setting value group 701 (FIG. 8) and the usage area of the computer 50 is changed from, for example, Japan to the United States, it is preferable that the setting value of the setting item "Original Size" is changed from the setting value "A5" in Japan to the initial value "Letter" in the United States.

In view of this situation, for example, a technique (also referred to as a technique according to a comparative example) is considered which, in a case where the usage area of the computer 50 is changed from Japan to the United States, always collectively changes the basic customized setting value group 701 (FIG. 8) to the initial value group (FIG. 9) in the United States (the changed area) according to the change in the usage area.

However, in a case where the basic customized setting value group 701 is always changed to the initial value group in the United States (the changed area) according to the change in the usage area, the following problem may occur.

Specifically, in a case where all of the setting values in the basic customized setting value group 701 are collectively changed according to the change in the usage area, even the value of at least one setting item which has been changed (customized) by the user is changed to the initial value in the United States. For example, even the value "Single-sided" (FIG. 8) of the setting item "Print Type" which has been customized from the initial value "Two-sided" by the user in Japan is also changed to the initial value "Two-sided" in the United States (that is, returned to the value "Two-sided"). As a result, the user needs to customize the setting value of the setting item "Print Type" to the value "Single-sided" again after the usage area is changed.

In view of this situation, in this embodiment, it is determined whether or not to change the setting value of each of a plurality of setting items (individual setting items) according to a change in the usage area of the computer 50.

Figure 4:
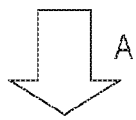
FIG. 4 is a diagram illustrating a print setting screen before and after a usage area is changed.

Then, the setting value of a change target item (for example, "Original Size"), which is a setting item whose setting value is determined to be changed according to the change in the usage area, among a plurality of setting items is changed to a value (for example "Letter") corresponding to the changed usage area (here, the United States) (see FIG. 4). In other words, the setting value of a setting item, which is determined to be changed according to the difference in culture (custom) between the usage area (Japan) before change and the changed usage area (the United State), among a plurality of setting items is changed to a value corresponding to the changed usage area (the United States).

In contrast, the setting value of a setting item (for example, "Print Type") other than the change target item among the plurality of setting items is not changed to a value (for example, "Two-sided") corresponding to the changed usage area and is maintained as the value (for example, "Single-sided") before the usage area is changed (see FIG. 1). In other words, the setting value of a setting item (whose change is not required), whose setting value does not need to be changed according to the difference in culture (custom) between the usage area (Japan) before change and the changed usage area (the United State), among a plurality of setting items is maintained as the value before the usage area is changed.

For Setting Value Control Process and the Like

Hereinafter, the operation of the computer 50 (printer driver) in a case where the printer driver starts will be described. In particular, here, an operation in a case where the printer driver starts after the user moves from Japan to the United States (for example, on a business trip) together with the computer 50 will be described. In addition, here, it is assumed that the above-mentioned customized setting (the registration of the basic customized setting value group 701 (FIG. 8)) has been performed in Japan (before movement to the United States).

Figure 10:
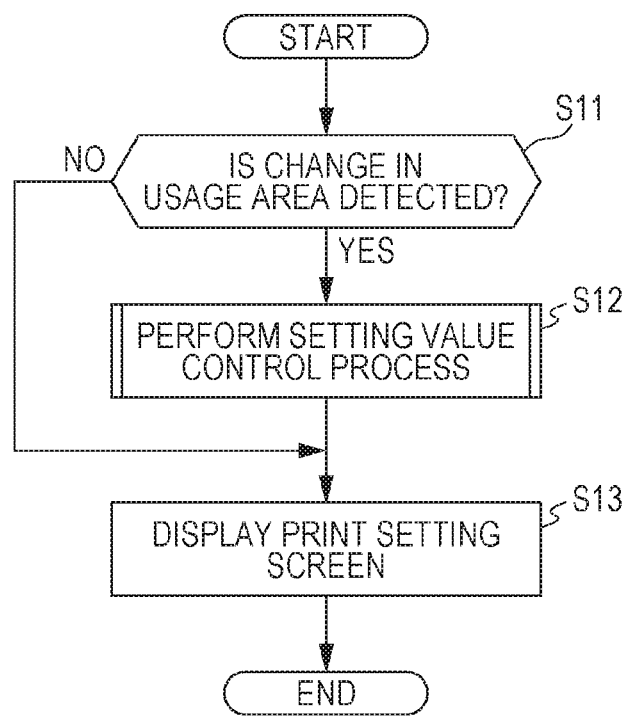
FIG. 10 is a flowchart illustrating an operation of the setting control device (printer driver)

FIG. 10 is a flowchart illustrating the operation of the computer 50 (printer driver) in a case where the printer driver starts. The flowchart illustrated in FIG. 10 starts in response to the startup of the printer driver.

First, in step S11, the computer 50 determines whether or not a change in the usage area of the computer 50 has been detected on the basis of area information (area setting information) in the computer 50.

The area information (area setting information) is information indicating the usage area of the computer 50. The user can change the usage area (area information) using an operating system (specifically, for example, an area setting change screen of the operating system) of the computer 50. Here, it is assumed that, after the user moves from Japan to the United States, the usage area of the computer 50 is changed from "Japan" to "the United States" before the printer driver starts. The information (area information) of the usage area changed by the user is stored in the computer 50.

The computer 50 (printer driver) acquires the usage area of the computer 50 on the basis of the area information stored in the computer 50 and detects a change in the usage area from Japan to the United States. Specifically, the computer 50 (printer driver) stores the usage area (for example, Japan) acquired at the time of the previous startup of the printer driver and detects a change in the usage area from Japan to the United States on the basis of the stored usage area ("Japan") and the usage area (for example, "the United States") acquired at the time of the current startup of the printer driver, in this way, it is determined in step S11 that a change in the usage area of the computer 50 (change in the usage area) has been detected and the process proceeds from step S11 to step S12.

Figure 11:
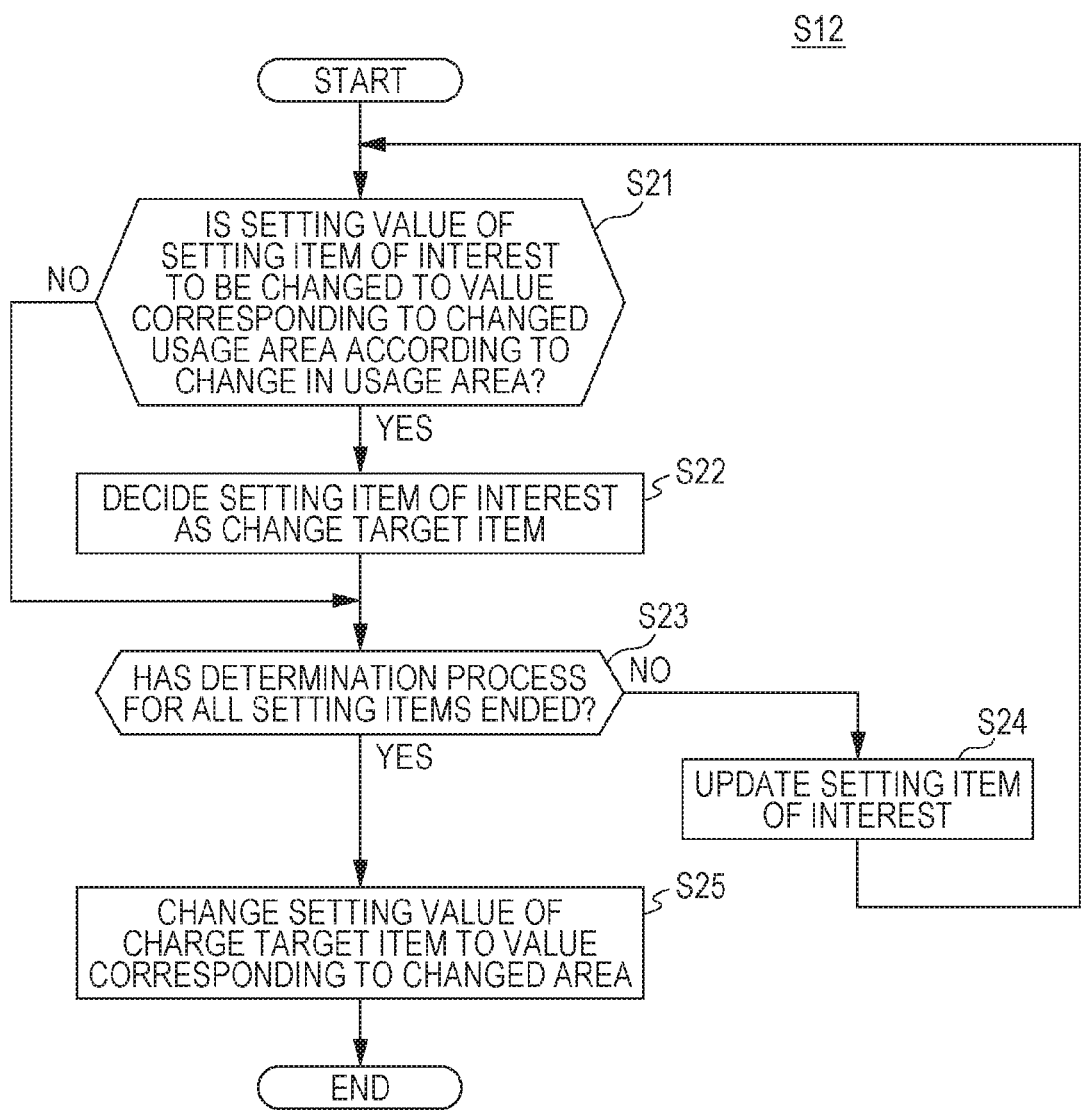
FIG. 11 is a diagram illustrating a sub-routine process related to a setting value control process.

In step S12, the computer 50 performs a control process (also referred to as a setting value control process) for the setting values of a plurality of setting items. FIG. 11 is a diagram illustrating a sub-routine process related to step S12 (setting value control process).

First, in step S21, the computer 50 (printer driver) determines whether or not to change the setting value of each of a plurality of setting items (individual setting items) according to the change in the usage area from Japan to the United States. In other words, it is determined whether or not each of the plurality of setting items corresponds to a setting item (change target item) whose setting value needs to be changed according to the change in the usage area from Japan to the United States. Specifically, it is determined whether or not the setting value of each of the plurality of setting items needs to be changed according to the difference in culture (custom) between Japan (the usage area before change) and the United State (the changed usage area). The process in step S21 is also referred to as a change necessity determination process.

Here, the computer 50 compares the initial value corresponding to the usage area (Japan) before change with the initial value corresponding to the usage area (the United States) after change for each setting item on the basis of the initial value group management table 500 (FIG. 9) and determines whether or not the initial values in the areas before and after change are different from each other.

Specifically, the computer 50 decides one of a plurality of setting items as a setting item of interest and determines whether or not the initial value corresponding to the usage area (Japan) before change and the initial value corresponding to the usage area (the United States) after change are different from each other for the decided setting item of interest.

In a case where it is determined in step S21 that the setting item of interest has different initial values in the usage areas before and after change, the process proceeds to step S22. The computer 50 decides the setting item of interest as the change target item. The change target item is a setting item whose setting value is determined to be changed according to a change in the usage area of the computer 50 (here, a change from Japan to the United States).

On the other hand, in a case where it is determined in step S21 that the setting item of interest has the same initial value in the usage areas before and after change, the process proceeds to step S23 without passing through step S22 (the setting item of interest is not decided as the change target item). In other words, the computer 50 decides the setting item of interest as a non-change target item. The non-change target item is a setting item (a setting item determined not to correspond to the change target item) other than the change target item among a plurality of setting items.

Here, as described above, the initial value group (FIG. 9) of each area is defined in advance considering, for example, the culture (custom) of each area. Therefore, the comparison between the initial values of the setting item of interest in the areas before and after change makes it possible to determine whether or not the setting values conventionally used in the areas before and after change are different from each other for the setting item of interest (that is, whether or not to change the setting value of the setting item of interest according to the difference in culture (custom) between the usage areas before and after change).

Then, in step S23, it is determined whether or not the change necessity determination process has been performed for all of the setting items.

In a case where there is a setting item for which the change necessity determination process has not been performed, the process proceeds from step S23 to step S24 and the setting item of interest is updated. Then, the change necessity determination process is performed for the next setting item of interest.

In this way, it is determined whether or not the setting value of each of a plurality of setting items needs to be changed according to a change in the usage area.

Here, as illustrated in FIG. 9, for the setting item "Original Size", the initial value in Japan is defined as a value "A4" and the initial value in the United States is defined as a value "Letter". Therefore, it is determined in step S21 that the setting item "Original Size" has different initial values in the areas before and after change and the setting item "Original Size" is decided as the change target item (step S22). In other words, it is determined that the setting value of the setting item "Original Size" needs to be changed according to the difference in culture (custom) between Japan (the usage area before change) and the United States (the usage area after change).

In contrast, as illustrated inn FIG. 9, for example, for the setting item "Print Type", the initial value in Japan is defined as the value "Two-sided" and the initial value in the United States is defined as the value "Two-sided". Therefore, it is determined in step S21 that the setting item "Print Type" has the same initial value in the areas before and after change. As a result, the setting item "Print Type" is decided as the non-change target item. In other words, it is determined that the setting value of the setting item "Print Type" does not need to be changed according to the difference in culture (custom) between Japan (the usage area before change) and the United States (the usage area after change). Here, setting items (for example, "Print Type" and "Page Layout") other than the setting item "Original Size" are decided as the non-change target items.

In a case where the change necessity determination process has been performed for all of the setting items, the process proceeds from step S23 to step S25.

In step S25, the computer 50 automatically changes the setting value of (only) the change target item among a plurality of setting items to a value corresponding to the changed usage area (the United States). Specifically, the setting value of the change target item in the registered basic customized setting value group 701 (FIG. 8) is automatically changed to the initial value (a value defined as the initial value in the United States) corresponding to the United States. Here, in the basic customized setting value group 701 (FIG. 8), the setting value of the setting item "Original Size" (change target item) is automatically changed from the value "A5" (FIG. 8) of the setting item "Original Size" which has been changed by the user to the initial value "Letter" (FIG. 9) of the setting item "Original Size" corresponding to the United States. In other words, in a case where it is determined that the setting value of the setting item "Original Size" needs to be changed according to the difference in culture between Japan and the United States even though the setting value of the setting item "Original Size" has been customized by the user in advance, the setting value of the setting item "Original Size" is changed to the initial value "Letter" corresponding to the United States.

With this configuration, after the user moves from Japan to the United States, the user does not need to manually change the setting value of the setting item "Original Size" (change target item) to a value corresponding to the United States (a value corresponding to the culture of the United States (here, "Letter")). Therefore, it is possible to reduce the time and effort required for the user to change the setting value of the change target item (the setting item whose setting value needs to be changed according to the difference in culture between the usage areas before and after change).

In contrast, the computer 50 does not change the setting value of the non-change target item among a plurality of setting items to a value corresponding to the changed usage area (the United States) and maintains the non-change target item at the setting value before the usage area is changed. Specifically, the setting value of the non-change target item in the registered, basic customized setting value group 701 (FIG. 8) is maintained. For example, in the basic customized setting value group 701 (FIG. 8), the setting value of the setting item "Print Type" (non-change target item) is not changed to the initial value "Two-sided" (FIG. 9) corresponding to the United States and is maintained as the value "Single-sided" (FIG. 8) which has been changed for the setting item "Print Type" by the user. Similarly, in the basic customized setting value group 701, the setting value of the setting item "Page Layout" (non-change target item) is maintained as the value "2 in 1" (FIG. 8) which has been changed for the setting item "Page Layout" by the user. In addition, in the basic customized setting value group 701, the setting values of other non-change target items (for example, "Original Orientation") are not changed to the values corresponding to the United States and are maintained as the values before the usage area is changed.

Then, the computer 50 stores (registers) a basic customized setting value group 701*b* changed from the basic customized setting value group 701 (701*a*) (FIG. 8) in Japan in the customized setting value group management table 700. FIG. 12 is a diagram illustrating the customized setting value group management table 700 in which the changed basic customized setting value group 701 (701*b*) has been registered. Here, the setting value of only the setting item "Original Size" (change target item) in the basic customized setting value group 701*a* (FIG. 8) in Japan is changed from the value "A5" to the initial value "Letter" in the United States and is then registered. In contrast, the setting values of the setting items (for example, "Print Type") (non-change target item) other than the setting item "Original Size" are maintained as the values in the basic customized setting value group 701*a* in Japan.

Then, the sub-routine process in step S12 (setting value control process) ends and the process proceeds from step S12 to step S13 (FIG. 10).

In step S13, the computer 50 displays the print setting screen 250 (200) (FIG. 7). FIG. 7 is a diagram illustrating the print setting screen 250 displayed immediately after the printer driver starts in the changed usage area. In the print setting screen 250, a plurality of setting items set to the basic customized setting value group 701 (701*b*) (FIG. 12) after the usage area is changed are displayed.

Specifically, as illustrated in FIG. 7, in the print setting screen 250, the setting value of the setting item "Original Size" (change target item) which is not the value "A5" (FIG. 6) before the usage area is changed and has been changed to the initial value "Letter" corresponding to the United States (the changed usage area) is displayed. In contrast, in the print setting screen 250, the setting value of the non-change target item (for the setting item "Print Type") which is not changed to the initial value corresponding to the United States and is maintained as the value before the usage area is changed is displayed (see FIG. 7).

Then, the user performs a print setting operation on the basis of the changed basic customized setting value group 701*b*.

As described, above, in the first embodiment, for example, it is determined whether or not the setting value of each of a plurality of setting items needs to be changed according to a change in the usage area from Japan to the United States (step S21 (FIG. 11)). In other words, the setting values of all of the setting items are not collectively changed to values corresponding to the United States (the changed usage area) and it is determined whether or not the setting value of each setting item (individual setting item) needs to be changed. Then, the setting value of the change target item (for example, "Original Size") among the plurality of setting items is changed to a value ("Letter") corresponding to the changed usage area (the United States) (step S25) (see FIG. 4). In contrast, the setting values of the setting items (for example, "Print Type") other than the change target item among the plurality of setting items are not changed to values corresponding to the changed usage area (the United States) and are maintained as the values before the usage area is changed (see FIG. 4). For example, the setting value of the setting item "Print Type" (non-change target item) is not changed to the value "Two-sided" corresponding to the United States and is maintained as the value "Single-sided" before the usage area is changed (see FIG. 4). Therefore, it is possible to flexibly perform control for the setting values of a plurality of setting items according to a change in the usage area of the computer 50.

In particular, in the customized setting value group (here, the basic customized setting value group 701), for example, in a case where the setting item "Print Type" (the setting item whose setting value has been changed by the user) is the non-change target item, the setting value of the setting item "Print Type" is not changed to the initial value "Two-sided" (FIG. 9) in the United States and is maintained as the value "Single-sided" changed by the user (see FIG. 4). Therefore, the user does not need to change (customize) the setting value of the setting item "Print Type" from the initial value "Two-sided" in the United States to the value "Single-sided" after the usage area is changed. In other words, even after the usage area is changed, the user can continuously perform the print setting operation on the basis of the value "Single-sided," of the setting item "Print Type" (non-change target item) designated by the user. Therefore, it is possible to flexibly perform control for the setting values of a plurality of setting items according to a change in the usage area, of the computer 50 while considering the convenience of the user.

In the first embodiment, the usage area of the computer 50 is changed from Japan to the United States. However, the invention is not limited thereto. The usage area of the computer 50 may be changed from Japan to an area other than the United States.

For example, in a case where the usage area is changed from Japan to European countries (for example, the United Kingdom), the following operation is performed.

Here, as illustrated in FIG. 9, all of the setting items have the same initial values in Japan and European countries. Therefore, in a case the usage area is changed from Japan to European countries, the change necessity determination process (step S21) is performed for each setting item as in the first embodiment. As a result, no setting items are decided as the change target items. In other words, all of the setting items are decided as the non-change target items. Then, the setting values of all of the setting items (non-change target items) are maintained as the values before the usage area is changed. As a result, in a case where the printer driver starts after the usage area is changed from Japan to European countries, the print setting screen 220 (the customized setting screen in Japan) (FIG. 6) displayed before the usage area is changed is displayed continuously (without any change).

For example, in a case where the usage area is changed from Japan to Arab countries (for example, the United Arab Emirates), the following operation is performed.

Here, as illustrated in FIG. 9, for a setting item "Binding Direction", an initial value "left binding" in Japan and an initial value "Right Binding" in Arab countries are different from each other. In addition, for the setting item "Page Layout (Order)", an initial value "Left to Right" in Japan and an initial value "Right to Left" in Arab countries are different from each other. Here, it is assumed that the initial value of the setting item "Binding Direction" in Arab countries is defined as the value "Right Binding" and the initial value of the setting item "Page Layout (Order)" in Arab countries is defined as the value "Right to Left", considering that an Arabic writing direction is a right-to-left direction (a method of writing characters from the right to the left).

In a case where the usage area is changed from Japan to Arab countries, it is determined that the two setting items ("Binding Direction" and "Page Layout (Order)") have different initial values in Japan (the usage area before change) and Arab countries (the changed usage area) (step S21) and the two setting items are decided as the change target items (step S22). In contrast, setting items other than the two setting items are decided as the non-change target items. Then, the setting values of (only) the setting items "Binding Direction" and "Page Layout (Order)" decided as the change target items among the plurality of setting items are changed to the initial values corresponding to Arab countries.

2. Second Embodiment

A second embodiment is a modification example of the first embodiment. Hereinafter, the difference from the first embodiment will be mainly described.

In the first embodiment, among a plurality of setting items, the setting item (see FIG. 9) having different initial values in the usage areas before and after change is decided as the change target item (steps S21 and S22).

In contrast, in the second embodiment, among a plurality of setting items, a setting item (see FIG. 13) whose setting value is predetermined to be changed according to an area change is decided as the change target item.

In the second embodiment, similarly to the first embodiment, the operations illustrated in FIGS. 10 and 11 are performed. However, in the second embodiment, the content of the process in step S21 of FIG. 11 is different from that in the first embodiment. In addition, the content of the process other than step S21 is the same as that in the first embodiment.

In the second embodiment, a change necessity management table 600 (FIG. 13) in which a setting item whose setting value needs to be changed according to an area change and a setting item whose setting value does not need to be changed are defined for each combination of the areas before and after change is stored in the computer 50. FIG. 13 is a diagram illustrating the change necessity management table 600. A printer driver developer (or a printer driver administrator) registers in advance the setting item whose setting value needs to be changed according to an area change and the setting item whose setting value does not need to be changed in the change necessity management table 600, considering the culture (custom) of each area. For example, in a case where the usage area is changed from Japan to the United States (or from the United States to Japan), the necessity to change the setting value of the setting item "Original Size" is registered in the change necessity management table 600, considering the difference in culture (custom) between Japan and the United States. In contrast, for setting items other than the setting item "Original Size", even in a case where the usage area is changed from Japan to the United States (or from the United States to Japan), information indicating that the setting values of the setting items do not need to be changed is registered in the change necessity management table 600.

In step S21 (FIG. 11) of the second embodiment, the computer 50 determines whether or not the setting value of each setting item is predetermined to be changed according to an area change on the basis of the change necessity management table 600 (FIG. 13).

For example, in a case where a change in the usage area from Japan to the United States is detected, in step S21, the computer 50 determines that the setting value of the setting item "Original Size" (the setting item of interest) is predetermined to be changed according to an area change from Japan to the United States in the change necessity management table 600. Then, the process proceeds from step S21 to step S22 and the setting item "Original Size" is decided as the change target item.

In contrast, for example, in step S21, the computer 50 determines that the setting value of the setting item "Original Size" (the setting item of interest) is predetermined not to be changed according to an area change from Japan to the United States in the change necessity management table 600. Then, the process proceeds from step S21 to step S23 without passing through step S22. In other words, the setting item "Print Type" is decided as the non-change target item.

Then, in step S25, the setting value of the setting item (here, "Original Size") decided as the change target item among a plurality of setting items is changed to the initial value ("Letter") corresponding to the changed usage area (here, the United States) (FIG. 7). In contrast, the setting values of the selling items (non-change target items) other than the change target item "Original Size" among the plurality of selling items are maintained as the values before the usage area, is changed. For example, the selling value of the setting item "Print Type" (non-change target item) is maintained as the value "Single-sided" changed by the user for the setting item "Print Type" (FIG. 7).

Similarly, even in a case where the usage area of the computer 50 is changed from Japan to an area other than the United States, the change target item and the non-change target item are decided on the basis of the change necessity management table 600 (FIG. 13).

For example, in a case where the usage area is changed from Japan to European countries, none of the setting items is decided as the change target item and all of the setting items are decided as the non-change target items (see also FIG. 13). Then, the setting values of all of the setting items (non-change target items) are maintained as the values before the usage area is changed.

In a case where the usage area is changed from Japan to Arab countries, two setting items, that is, the setting item "Binding Direction" and the selling item "Page Layout (Order)" are determined as change target items and the setting items other than the two setting items are decided as the non-change target items (see also FIG. 13). Then, the setting values of (only) the two setting items ("Binding Direction" and "Page Layout (Order)") among a plurality of setting items are changed to the initial values corresponding to Arab countries.

3. Third Embodiment

A third embodiment is a modification example of the first embodiment. Hereinafter, the difference from the first embodiment will be mainly described.

In the first embodiment, the setting value control process (step S12 (FIG. 11)) is performed for the basic customized setting, value group 701 (the customized setting value group set as the setting value group by the user immediately after the printer driver starts) (FIG. 8).

Here, in the printer driver, the user can register (store) a customized setting value group different from the basic customized setting value group 701 in advance for a plurality of setting items (see FIG. 14). Then, in a case where the user wants to use the registered customized setting value group, the user performs a predetermined user operation on the print setting screen 200 to reflect (call) the customized setting value group in the print setting screen 200. The customized setting value group is also referred to as a "favorite setting value group" since it is a customized setting value group that can be called at the timing desired by the user. In addition, the customized setting value group is referred to as a "preliminary customized setting value group" since it is a setting value group that has been preliminarily registered.

In the third embodiment, the setting value control process (step S12 (FIG. 11)) is performed not only for the basic customized setting value group 701 but also for the favorite setting value group.

First, before the setting value control process for the favorite setting value group is described, a registration process and a call processing (reflection process) for the favorite setting value group will be described. Here, a favorite setting value group 702 ("Favorite Setting 1" (see FIG. 14)) has already been registered and a process of registering a new favorite setting value group 703 is performed. In addition, here, it is assumed that the process of registering the favorite setting value group 703 is performed before the usage area is changed (in Japan).

Specifically, first, the user sets the setting value of each setting item in the print setting screen 220 (the print setting screen in which the basic customized setting value group 701 has been reflected) (FIG. 6). Here, the user changes the setting value of the setting item "Original Size" (from a value "A5") to a value "A3" and changes the setting value of the setting item "Page Layout" (from a value "2 in 1") to a value "4 in 1" (see FIG. 15). In addition, here, the setting values of other setting items are set to the values in the basic customized setting value group 701 without any change. FIG. 15 is a diagram illustrating a print setting screen 230 (200) after the setting values of two setting items ("Original Size" and "Page Layout") are changed by the user.

Then, the user presses an "Add" button 205 (FIG. 15) on the print setting screen 230 and gives a registered name (for example, "Favorite Setting 2") to the customized setting value group (favorite setting value group) to be registered.

Then, the computer 50 (printer driver) registers the setting value group in which the setting values of the setting item "Original Size" and the setting item "Page Layout" among the plurality of setting items have been changed by the user as a favorite setting value group 703 in response to the registration operation of the user (see FIG. 14). FIG. 14 is a diagram illustrating the customized setting value group management table 700 in which the favorite setting value group (new favorite setting value group 703) has been registered.

In this way, the user can register the customized setting value groups (favorite setting value groups 702 and 703) different from the basic customized setting value group 701 in advance.

The process of calling the registered favorite setting value group (for example, the favorite setting value group 703) (the process of reflecting the registered favorite setting value group in the print setting screen 200) is performed as follows. Specifically, first, a list of the registered favorite setting value groups is displayed on the print setting screen 220 in response to the operation of pressing a drop-down button 207, (see FIG. 16). The drop-down button 207 is a user interface component for giving an instruction of the display of a list of the favorite setting value groups. Then, in a case where the user performs an operation of selecting (calling) the favorite setting value group 703 ("Favorite Setting 2"), the print setting screen 230 (FIG. 15) in which the selected favorite setting value group 703 has been reflected in the setting value of each setting item is displayed in response to the selection operation. For example, the setting value of the setting item "Original Size" is changed to the value "A3" of the setting item "Original Size" in the favorite setting value group 703 (see FIG. 15). In addition, the setting value of the setting item "Page Layout" is changed to the value "4 in 1" of the setting item "Page Layout" in the favorite setting value group 703 (see FIG. 15).

As such, the user can reflect (call) the registered favorite setting value group (here, 703) in the print setting screen 230 (FIG. 15).

Next, the setting value control process (step S12 (FIG. 11)) for the favorite setting value groups 702 and 703 will be described assuming that the favorite setting value groups 702 and 703 (FIG. 14) have been registered in advance before the usage area is changed. In particular, here, the setting value control process (step S12) for the favorite setting value groups 702 and 703 after the usage area of the computer 50 is changed from Japan to the United States will be described.

In the third embodiment, the setting value control process for the favorite setting value groups 702 and 703 is performed at the same time as the setting value control process for the basic customized setting value group 701 (at the time of the startup of the printer driver).

Specifically, first, similarly to the first embodiment, the change necessity determination process (step S21) is performed for each of a plurality of setting items to decide the change target item and the non-change target item (step S22). Here, among the plurality of selling items, the setting item "Original Size" is decided as the change target item and setting items other than the setting item "Original Size" are decided as the non-change target items.

Then, in step S25, the setting value of (only) the change target item ("Original Size") among the plurality of setting items is changed to the initial value corresponding to the changed area (here, the United States)). In contrast, the setting values of the non-change target items are maintained as the values before the usage area is changed.

Specifically, in a plurality of customized setting value groups 701 to 703 (the basic customized setting value group 701 and the favorite setting value groups 702 and 703), the setting value of the change target item ("Original Size") is changed to the initial value in the changed area (the United States). In contrast, in the customized setting value groups 701 to 703, the setting value of each of the non-change target items is maintained as the value before the usage area is changed.

Specifically, first, similarly to the first embodiment, in the basic customized setting value group 701 (FIG. 14), the setting value of the change target item "Original Size" is changed from the value "A5" (FIG. 14) changed by the user for the setting item "Original Size" to the initial value "Letter" corresponding to the United States (see also FIG. 7). In contrast, in the basic customized setting value group 701 (FIG. 8), the setting values of the non-change target items (here, the setting items other than the setting item "Original Size") are maintained as the values before the usage area is changed. For example, in the basic customized setting value group 701, the setting value of the setting item "Page Layout" (non-change target item) is maintained as the value "2 in 1" (FIG. 14) changed by the user for the setting item "Page Layout" (see also FIG. 7).

In addition, for the favorite setting value groups 702 and 703, similarly, in the favorite setting value groups 702 and 703, the setting value of the change target item "Original Size" is changed to the initial value in the changed area (the United States). In contrast, in the favorite setting value groups 702 and 703, the setting values of the non-change target items are maintained as the values before the usage area is changed.

For example, in the favorite setting value group 703 (FIG. 14), the setting value of the change target item "Original Size" is changed from the value "A3" (FIG. 14) changed by the user for the setting item "Original Size" to the initial value "Letter" corresponding to the United States (see FIG. 17). FIG. 17 is a diagram illustrating a print setting screen 260 (200) which is displayed after the usage area is changed and in which the changed favorite setting value group 703 has been reflected. In contrast, in the favorite setting value group 703, the setting values of the non-change target items (here, the setting items other than the setting item "Original Size") are maintained as the values before the usage area is changed. For example, in the favorite setting value group 703, the setting value of the setting item "Page Layout" (non-change target item) is maintained as the value "4 in 1" (FIG. 14) changed by the user for the setting item "Page Layout" (see FIG. 17). This holds for the favorite setting value group 702.

As such, the setting value control process (step S12 (FIG. 11)) is performed not only for the basic customized setting value group 701 but also for the favorite setting value groups 702 and 703.

Then, the computer 50 stores (registers) customized setting value groups 701b to 703b changed from the customized setting value groups 701 to 703 (701a to 703a) (FIG. 14) in Japan in the customized setting value group management table 700. FIG. 19 is a diagram illustrating the customized setting value group management table 700 in which the changed customized setting value groups 701 to 703 (701b to 703b) have been registered. Here, in the customized setting value groups 701a to 703a (FIG. 14) in Japan, the setting value of only the setting item "Original Size" (change target item) is changed to the initial value "Letter" in the United States and the changed setting value is registered. In contrast, the setting values of the setting items (for example, "Print Type") (non-change target item) other than the setting item "Original Size" are maintained as the values in the customized setting value groups 701a to 703a in Japan.

Here, the setting value control process (step S12) for the favorite setting value groups 702 and 703 is performed at the same time as the setting value control process for the basic customized setting value group 701 (at the time of the startup of the printer driver). However, the invention is not limited thereto. The setting value control process for the favorite setting value groups 702 and 703 and the setting value control process for the basic customized setting value group 701 may be performed at different times. For example, the setting value control process for each of the favorite setting value groups 702 and 703 may be performed in response to the operation (call instruction) of calling each of the favorite setting value groups 702 and 703.

Specifically, first, similarly to the first embodiment, after the usage area of the computer 50 is changed, for example, from Japan to the United States, the setting value control process (step S12 (FIG. 11)) for the basic customized setting value group 701 is performed in response to the startup of the printer driver. In addition, at this point of time (the point of time immediately after the printer driver starts after the use area is changed), the setting value control process for the favorite setting value groups 702 and 703 has not been performed yet.

Then, as a result of the setting value control process for the basic customized setting value group 701, the print setting screen 250 (FIG. 7) in which the changed basic customized setting value group 701b (FIG. 19) has been reflected is displayed. Then, in a case where the drop-down button 207 is pressed in the print setting screen 250, a list of the favorite setting value groups is displayed (see FIG. 18). FIG. 18 is a diagram illustrating the print setting screen 250 which is displayed after the usage area is changed (here, changed from Japan to the United States) and in which a list of the favorite setting value groups has been displayed.

In a case where one (here, 703) of the plurality of favorite setting value groups 702 and 703 in the list of the favorite setting value groups displayed on the print setting screen 250 (FIG. 18) is selected, the computer 50 receives an instruction to call the favorite setting value group 703. Then, the computer 50 starts the process illustrated in FIG. 10 for the favorite setting value group 703 in response to the instruction to call the favorite setting value group 703.

Specifically, the computer 50 stores the usage area (Japan) at the time of the previous call of the favorite setting value group 703 and determines that the usage area of the computer 50 has been changed from Japan to the United States on the basis of the usage area (Japan) at the time of the previous call of the favorite selling value group 703 and the usage area (the United States) at the time of the current call of the favorite setting value group 703 (step S11 (FIG. 10)). Then, the computer 50 performs the setting value control process (step S12 (FIG. 11)) for the favorite setting value group 703. In addition, the content of the process in step S12 for the favorite setting value group 703 is the same as that in the third embodiment.

As such, the setting value control process for the favorite setting value group (here, 703) and the setting value control process for the basic customized setting value group 701 may be performed at different times.

Here, the third embodiment is given as a modification example of the first embodiment. However, the invention is not limited thereto. The idea of the third embodiment may be applied, to the second embodiment.

4. Modification Examples

The embodiments of the invention have been described above. However, the invention not limited to the above-mentioned content.

Modification Example Related to Notification of Change in Setting Value of Change Target Item to User For example, in each of the above-described embodiments, the user may be notified that the setting value of the change target item has been changed.

Figure 22:
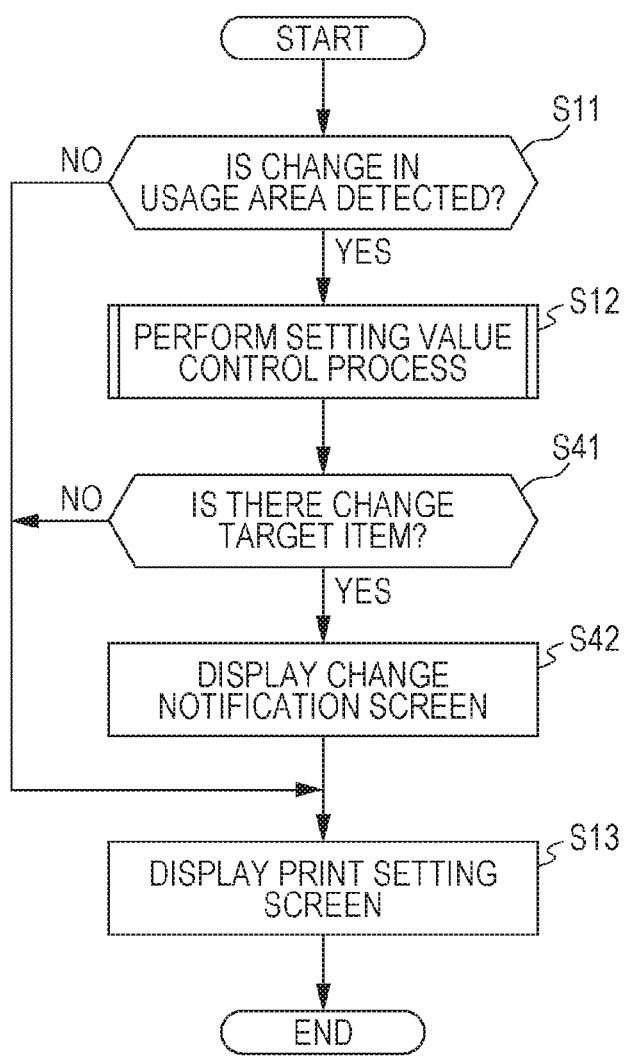
FIG. 22 is a flowchart illustrating an operation of a setting control device (printer driver) according to a modification example.

FIG. 22 is a flowchart illustrating the operation of the computer 50 (printer driver) according to the modification example. In FIG. 22, a process in steps S41 and S42 is performed between step S12 and step S13 illustrated in FIG. 10. In addition, the content of a process in steps S11 to S13 is the same as that in the first embodiment (FIG. 10).

First, in step S41 (FIG. 22), the computer 50 (printer driver) determines whether or not there is a change target item.

Figure 20:
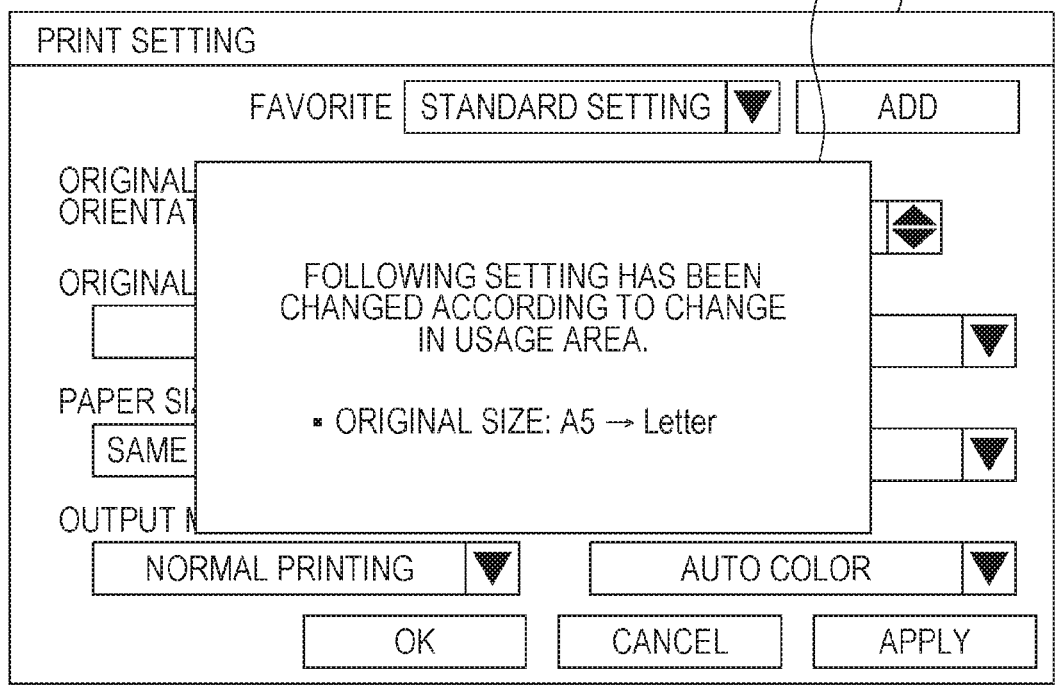
FIG. 20 is a diagram illustrating a change notification screen.

In a case where it is determined in step S41 that there is a change target item, the process proceeds from step S41 to step S42 and the computer 50 displays a change notification screen 300 (FIG. 20).

FIG. 20 is a diagram illustrating the change notification screen 300. A notification indicating that the setting value of the setting item "Original Size" (change target item) has been changed from the value "A5" to the value "Letter" (a value corresponding to the changed usage area) according to a change in the usage area is displayed on the change notification screen 300.

As such, the user may be notified that the setting value of the change target item. ("Original Size") has been changed. This configuration makes it possible for the user to accuracy recognize the setting state of each setting item even in a case where the setting value of the change target item ("Original Size") has been changed.

Modification Example Related to Confirmation of Whether or Not User Permits Changing Setting Value of Change Target Item Alternatively, for example, in each of the above-described embodiments, the user is asked whether or not to permit changing the setting value of the change target item. In a case where the user permits changing the setting value of the change target item, the setting value of the change target item may be changed to a value corresponding to the changed usage area.

Figure 23:
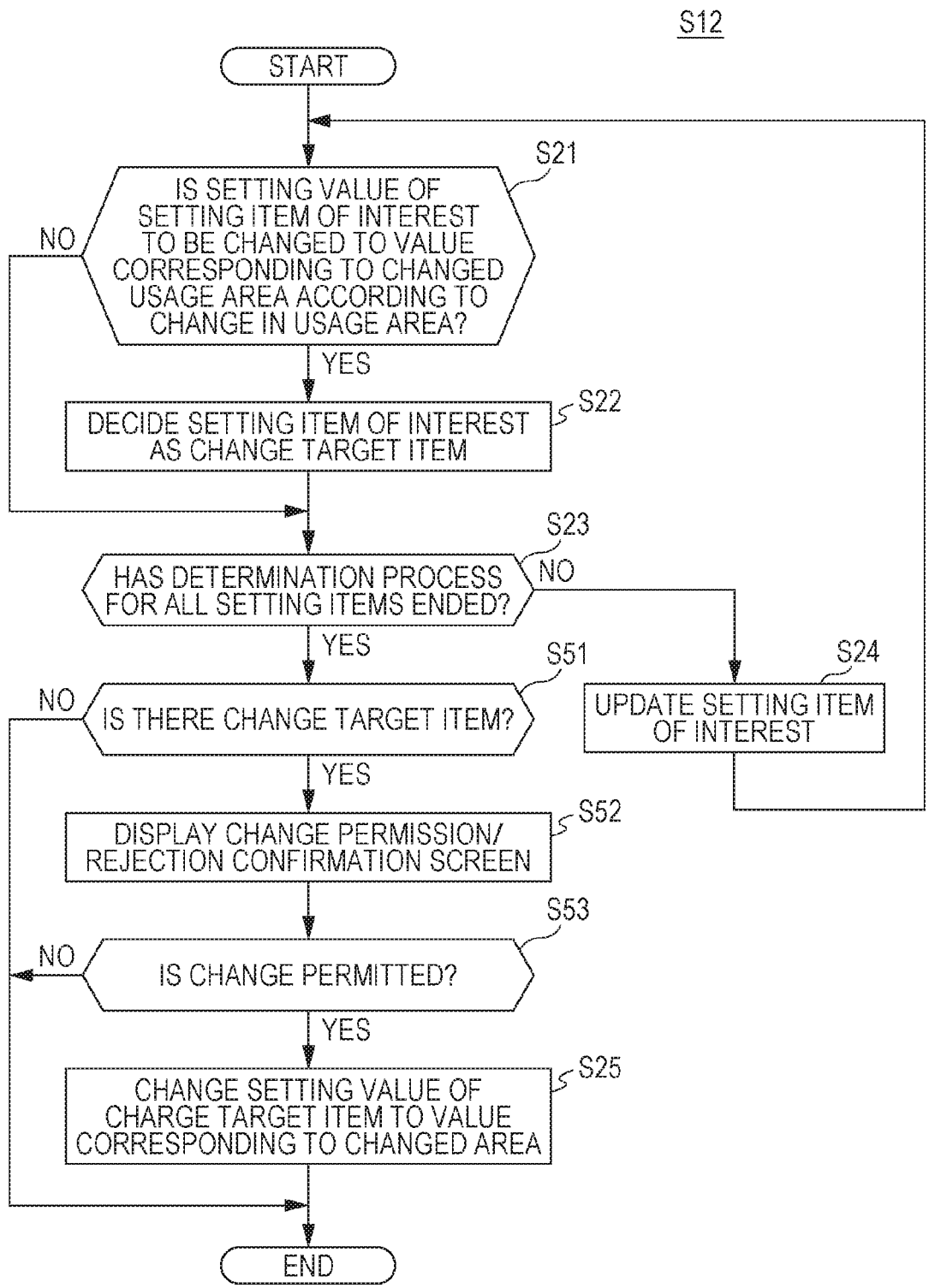
FIG. 23 is a diagram illustrating a sub-routine process related to a setting value control process according to a modification example.

FIG. 23 is a diagram illustrating a sub-routine process related to the setting value control process (step S12 (FIG. 10)) according to this modification example. In FIG. 23, a process in steps S51 to S53 is performed between step S23 and step S25 illustrated in FIG. 11. In addition, the content of the process in steps S21 to S25 illustrated in FIG. 23 is the same as that in the first embodiment (FIG. 11).

First, in step S51, the computer 50 determines whether or not there is a change target item.

For example, in a case where the setting item "Original Size" is decided as the change target item in step S22, it is determined in step S51 that there is a change target item and the process proceeds from step S51 to step S52.

Figure 21:
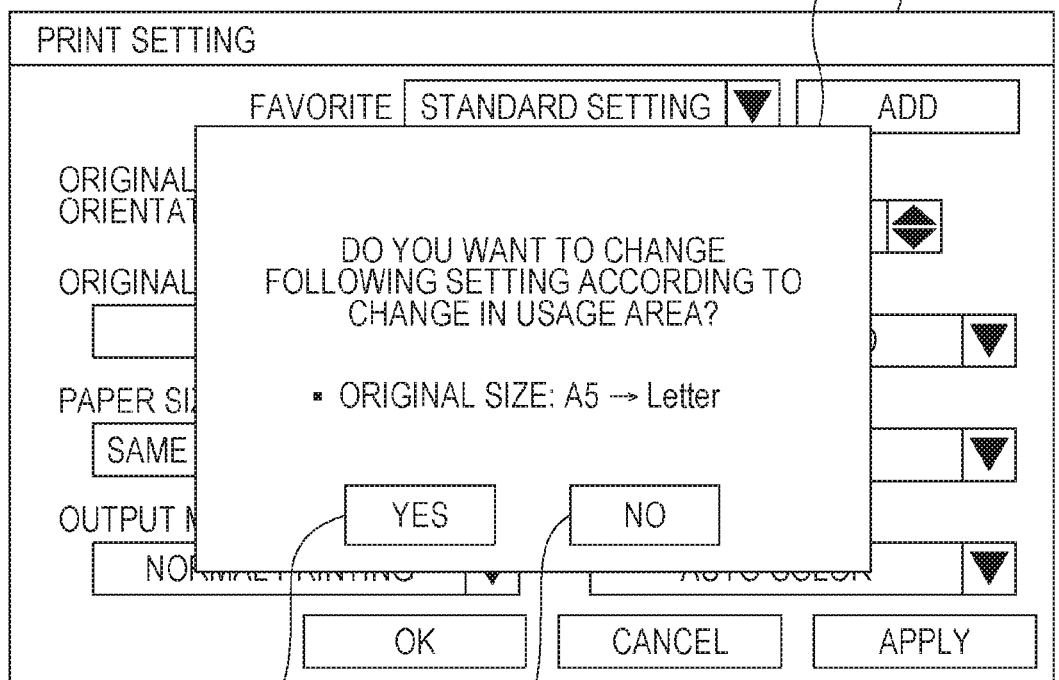
FIG. 21 is a diagram illustrating a change permission/rejection confirmation screen.

In step S52, the computer 50 (printer driver) displays a change permission/rejection confirmation screen 350 (FIG. 21) so as to be superimposed on the print setting screen 220 (the print setting screen displayed before the area is changed). FIG. 21 is a diagram illustrating the change permission/rejection confirmation screen 350.

The change target item (here, "Original Size") and the setting values of the change target item before and after the area is changed are displayed on the change permission/rejection confirmation screen 350. In addition, the change permission/rejection confirmation screen 350 is provided with a button ("YES" button 351) for giving an instruction of the permission of a change in the setting value of the change target item and a button ("NO" button 352) for giving an instruction of the rejection of a change in the setting value of the change target. The user checks the change permission/rejection confirmation screen 350, decides whether or not to permit changing the setting value of the change target item, and presses one of the buttons 351 and 352 according to the content of the decision. Then, the computer 50 receives an instruction related to the permission or rejection of the change in the setting value of the change target item from the user.

For example, in a case where the user permits changing the setting value of the setting item "Original Size", the user presses the "YES" button 351 (FIG. 21) on the change permission/rejection confirmation screen 350. The computer 50 determines in step S53 that the user has permitted changing the setting value of the change target item "Original Size" on the basis of the operation of pressing the "YES" button 351 (an instruction to permit changing the setting value of the change target item).

Then, the process proceeds from step S53 to step S25 and the setting value of the change target item "Original Size" is changed to the value "Letter" (FIG. 7) corresponding to the changed usage area (the United States).

In contrast, for example, in a case where A5-size paper is prepared in an office in the changed usage area (the United States), the user does not permit changing the setting value of the setting item "Original Size" and presses the "NO" Button 352 (FIG. 21) on the change permission/rejection confirmation screen 350. The computer 50 determines in step S53 that the user has not permitted changing in the setting value of the change target item "Original Size" on the basis of the operation of pressing the "NO" button 352 (an instruction not to permit changing the setting value of the change target item).

Then, the process ends without passing through step S25. In other words, the setting value of the change target item "Original Size" is not changed to the value ("Letter") corresponding to the changed usage area (the United States) and is maintained as the value (the value "A5" changed by the user for the setting item "Original Size" (FIG. 6)) before the usage area is changed.

As such, in a case where the user permits changing the setting value of the change target item, a process of changing the setting value of the change target item may be performed.

With this configuration, the user is asked whether or not to change the setting value of the change target item and then the process of changing the setting value of the change target item is performed. Therefore, it is possible to further flexibly perform control for the setting values of a plurality of setting items according to a change in the usage area of the computer 50.

In this modification example, in a case where a change in the setting value of the change target item is permitted (in a case where the "YES" button 351 is pressed on the change permission/rejection confirmation screen 350 illustrated in FIG. 21), the user may be notified that the setting value of the change target item has been changed (see FIG. 20).

Other Modification Examples

For example, in each of the above-described embodiments, a change in the usage area of the computer 50 is detected on the basis of the area information that can be set by the operating system of the computer 50 (the area information managed by the operating system) (step S11 (FIG. 10)). However, the invention is not limited thereto. For example, a change in the usage area of the computer 50 may be detected on the basis of area information that can be set by the printer driver (area information managed by the printer driver).

For example, in each of the above-described embodiments, the setting value control process (step S12 (FIG. 11)) is performed for a plurality of setting items used for the setting of a print job. However, the invention is not limited thereto. The setting value control process may be performed for a plurality of setting items used for the setting of other types of jobs (for example, a scanning job). For example, in a case where the setting of a scanning job executed by the MFP 10 is performed by the computer 50, the setting value control process (step S12) may be performed for a plurality of setting items that can be set in the scanning job. Then, among the plurality of setting items, for example, a setting item "Read Size" may be decided as the change target item and the setting value of the setting item "Read Size" may be changed to a value (for example, "Letter") corresponding to the changed usage area (for example, the United States). In contrast, the other setting items (for example, "Resolution") may be decided as the non-change target items and the setting values of the other setting items may be maintained as the values before the usage area is changed.

For example, in each of the above-described embodiments, the computer 50 (a device different from a job execution device (for example, the MFP 10)) is given as an example of the setting control device that performs the operation illustrated in FIGS. 10 and 11 (setting value control process). However, the invention is not limited thereto. For example, the setting control device may be the job execution device (for example, a printer or a scanner). In this case, the setting value control process (for example, FIGS. 10 and 11) may be performed for each setting item according to a change in the usage area of the job execution device on the display screen of the job execution device.

Although embodiments of the present invention have been described and illustrated in detail, the disclosed embodiments are made for purposes of illustration and example only and not limitation. The scope of the present invention should be interpreted by terms of the appended claims.

What is claimed is:

1. A non-transitory recording medium storing a computer readable program for a setting control device, wherein the setting control device includes an initial setting value group, and the initial setting value group includes a plurality of setting values for each of a plurality of setting items for each of a plurality of areas; the program causes the setting control device to perform:
    a) detecting a change from a first of the plurality of areas to a second of the plurality of areas according to a change in a usage area of the setting control device;
    b) in a case where the change in the usage area from the first area to the second area is detected in a), determining whether or not to change the setting value of each of the plurality of setting items according to the change in the usage area from the first area to the second area; and
    c) performing control for the setting values of the plurality of setting items on the basis of a determination result in b),
    wherein:
    a setting item of the plurality of setting items is considered a change target item if the setting value for that setting item is different for the first and second areas, and a setting item of the plurality of setting items is considered a non-change target item if the setting value for that setting item is the same for the first and second areas,
    in c), a setting value of a change target item is changed to a value corresponding to the second area, and
    a setting value of a non-change target item is maintained as a value before the usage area is changed.

2. The non-transitory recording medium storing a computer readable program according to claim 1,
    wherein the program causes the setting control device to further perform:
    d) registering a customized setting value group that is a setting value group which is related to the plurality of setting items and in which the setting value of at least one of the plurality of setting items has been changed by a user before the usage area is changed, and
    in c), the setting value of the change target item in the customized setting value group registered in d) is changed to the value corresponding to the second area and the setting value of the non-change target item in the customized setting value group registered in d) is maintained.

3. The non-transitory recording medium storing a computer readable program according to claim 2,
    wherein, in c), in a case where a specific setting item among the at least one setting item is the non-change target item, a setting value of the specific setting item in the customized setting value group registered in d) is maintained as a value that has been changed by the user for the specific setting item.

4. The non-transitory recording medium storing a computer readable program according to claim 2,
    wherein, in d), a first customized setting value group which has been set by the user as the setting value group related to the plurality of setting items immediately after the program starts is registered before the usage area is changed, and
    in c), the setting value of the change target item in the first customized setting value group is changed to the value corresponding to the second area and the setting value of the non-change target item in the first customized setting value group is maintained.

5. The non-transitory recording medium storing a computer readable program according to claim 4,
    wherein, in d), a second customized setting value group different from the first customized setting value group is further registered before the usage area is changed, and
    in c), the setting value of the change target item in the second customized setting value group is changed to the value corresponding to the second area and the setting value of the non-change target item in the second customized setting value group is maintained.

6. The non-transitory recording medium storing a computer readable program according to claim 1,
wherein, in b), an initial value corresponding to the first area is compared with an initial value corresponding to the second area for each setting item, and
among the plurality of setting items, a setting item having different initial values in the first area and the second area is decided as the change target item.

7. The non-transitory recording medium storing a computer readable program according to claim 1,
wherein, in b), it is determined whether or not the setting value of each setting item is predetermined to be changed according to an area change between the first area and the second area, and
among the plurality of setting items, a setting item whose setting value is predetermined to be changed according to the area change between the first area and the second area is decided as the change target item.

8. The non-transitory recording medium storing a computer readable program according to claim 1,
wherein the program causes the setting control device to further perform:
e) notifying a user that the setting value of the change target item has been changed.

9. The non-transitory recording medium storing a computer readable program according to claim 1,
wherein the program causes the setting control device to further perform:
f) asking a user whether or not to permit changing the setting value of the change target item,
in c), in a case where the user permits changing the setting value of the change target item, the setting value of the change target item is changed to the value corresponding to the second area.

10. A setting control device comprising:
an initial setting value group, and the initial setting value group includes a plurality of setting values for each of a plurality of setting items for each of a plurality of areas, wherein a setting item of the plurality of setting items is considered a change target item if the setting value for that setting item is different for the first and second areas, and a setting item of the plurality of setting items is considered a non-change target item if the setting value for that setting item is the same for the first and second areas,
a hardware processor configured to:
detect a change in a usage area of the setting control device from a first of the plurality of areas to a second of the plurality of areas,
determine whether or not to change the setting value of each of the plurality of setting items according to a change in the usage area from the first area to the second area in a case where the change in the usage area from the first area to the second area is detected, and
perform control for the setting values of the plurality of setting items on the basis of a determination result of the hardware processor,
when a change in the usage area is detected from the first area to the second area, change a setting value of a change target item to a value corresponding to the second area, and
when a change in the usage area is detected from the first area to the second area, maintain a setting value of a non-change target item as a value before the usage area is changed.

11. The setting control device according to claim 10,
wherein the hardware processor registers a customized setting value group that is a setting value group which is related to the plurality of setting items and in which the setting value of at least one of the plurality of setting items has been changed by a user before the usage area is changed, and
in a case where the change in the usage area is detected, the hardware processor changes the setting value of the change target item in the customized setting value group to the value corresponding to the second area and maintains the setting value of the non-change target item in the customized setting value group.

12. The setting control device according to claim 11,
wherein, in a case where a specific setting item among the at least one setting item is the non-change target item, the hardware processor maintains a setting value of the specific setting item in the customized setting value group as a value that has been changed by the user for the specific setting item.

13. The setting control device according to claim 11,
wherein a program that is capable of setting the setting values of the plurality of setting items is installed in the setting control device,
the hardware processor registers a first customized setting value group which has been set by the user as the setting value group related to the plurality of setting items immediately after the program starts before the usage area is changed, and
in a case where the change in the usage area is detected, the hardware processor changes the setting value of the change target item in the first customized setting value group to the value corresponding to the second area and maintains the setting value of the non-change target item in the first customized setting value group.

14. The setting control device according to claim 13,
wherein the hardware processor further registers a second customized setting value group different from the first customized setting value group before the usage area is changed, and
in a case where the change in the usage area is detected, the hardware processor changes the setting value of the change target item in the second customized setting value group to the value corresponding to the second area and maintains the setting value of the non-change target item in the second customized setting value group.

15. The setting control device according to claim 10,
wherein the hardware processor compares an initial value corresponding to the first area with an initial value corresponding to the second area for each setting item, and
the hardware processor decides a setting item having different initial values in the first area and the second area among the plurality of setting items as the change target item.

16. The setting control device according to claim 10,
wherein the hardware processor determines whether or not the setting value of each setting item is predetermined to be changed according to an area change between the first area and the second area, and
the hardware processor decides a setting item whose setting value is predetermined to be changed according to the area change between the first area and the second area among the plurality of setting items as the change target item.

17. The setting control device according to claim 10,
wherein the hardware processor notifies a user that the setting value of the change target item has been changed.

18. The setting control device according to claim 10,
wherein the hardware processor asks a user whether or not to permit changing the setting value of the change target item, and in a case where the user permits changing the setting value of the change target item, the hardware processor changes the setting value of the change target item to the value corresponding to the second area.

19. A setting control method for a setting control device including an initial setting value group, and the initial setting value group includes a plurality of setting values for each of a plurality of setting items for each of a plurality of areas, wherein a setting item of the plurality of setting items is considered a change target item if the setting value for that setting item is different for the first and second areas, and a setting item of the plurality of setting items is considered a non-change target item if the setting value for that setting item is the same for the first and second areas, the method comprising:

a) detecting a change from a first of the plurality of areas to a second of the plurality of areas according to a change in a usage area of a setting control device;

b), in a case where the change in the usage area is detected from the first area to the second area in a), determining whether or not to change the setting value of each of the plurality of setting items according to the change in the usage area from the first area to the second area; and c) performing control for the setting values of the plurality of setting items on the basis of a determination result in b), wherein, in c), a setting value of a change target item is changed to a value corresponding to the second area, and a setting value of a non-change target item is maintained as a value before the usage area is changed.

\* \* \* \* \*